US011188348B2

(12) United States Patent
Chikin et al.

(10) Patent No.: US 11,188,348 B2
(45) Date of Patent: Nov. 30, 2021

(54) HYBRID COMPUTING DEVICE SELECTION ANALYSIS

(71) Applicant: INTERNATIONAL BUSINESS MACHINES CORPORATION, Armonk, NY (US)

(72) Inventors: Artem Chikin, Edmonton (CA); Ettore Tiotto, Whitby (CA); Jose N. Amaral, Edmonton (CA); Karim Ali, Edmonton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 16/118,873

(22) Filed: Aug. 31, 2018

(65) Prior Publication Data

US 2020/0073677 A1   Mar. 5, 2020

(51) Int. Cl.
 *G06F 9/445*   (2018.01)
 *G06F 11/30*   (2006.01)
 *G06F 11/34*   (2006.01)

(52) U.S. Cl.
 CPC ...... *G06F 9/44505* (2013.01); *G06F 11/3024* (2013.01); *G06F 11/3409* (2013.01)

(58) Field of Classification Search
 CPC ............ G06F 9/44505; G06F 11/3024; G06F 11/3409; G06F 9/545
 See application file for complete search history.

(56) References Cited

U.S. PATENT DOCUMENTS

| 6,021,425 A * | 2/2000 | Waldron, III | ......... G06F 9/4881 718/103 |
| 8,284,205 B2 * | 10/2012 | Miller | ................... G06F 1/3203 345/502 |
| 8,416,461 B2 * | 4/2013 | Nakazawa | ............. H03C 3/095 327/156 |

(Continued)

FOREIGN PATENT DOCUMENTS

WO   2016105840 A1   6/2016

OTHER PUBLICATIONS

Hardware System Synthesis from Domain-Specific Languages, Nithin et al., IEEE, pp. 1-8 (Year: 2014).*

(Continued)

*Primary Examiner* — Aurel Prifti
(74) *Attorney, Agent, or Firm* — Cantor Colburn LLP; Edward Wixted

(57) ABSTRACT

Methods, systems, and computer program products for hardware device selection in a computing environment are provided. Aspects include receiving, by a processor, a request to execute a programming code, wherein the processor is operating in a hybrid computing environment comprising a plurality of hardware devices. A performance model associated with the programming code is obtained by the processor. Runtime data associated with the programming code is obtained by the processor. The runtime data is fed in to the performance model to determine an execution cost for executing the programming code on each of the plurality of hardware devices and a target hardware device is selected from the plurality of hardware devices based on the execution costs.

17 Claims, 7 Drawing Sheets

(56) References Cited

U.S. PATENT DOCUMENTS

| | | | |
|---|---|---|---|
| 8,447,569 B1* | 5/2013 | Marwah | G06F 11/008 702/186 |
| 8,662,943 B2* | 3/2014 | Conroy | G06F 1/26 439/894 |
| 8,667,474 B2 | 3/2014 | Radigan | |
| 8,707,314 B2* | 4/2014 | Gummaraju | G06F 9/5044 718/102 |
| 8,892,931 B2* | 11/2014 | Kruglick | G06F 1/3203 713/340 |
| 9,218,443 B1* | 12/2015 | Styles | G06F 30/327 |
| 9,733,978 B2* | 8/2017 | Suarez Gracia | G06F 9/5027 |
| 9,830,187 B1* | 11/2017 | Blaine | G06F 9/4881 |
| 9,940,125 B1* | 4/2018 | Espy | G06F 8/65 |
| 9,959,142 B2* | 5/2018 | Hsu | G06F 9/5044 |
| 10,223,463 B2* | 3/2019 | Cao | G06F 3/04855 |
| 10,417,052 B2* | 9/2019 | Chen | G06F 11/3644 |
| 2007/0283337 A1 | 12/2007 | Kasahara et al. | |
| 2008/0163183 A1* | 7/2008 | Li | G06F 8/456 717/149 |
| 2008/0276261 A1* | 11/2008 | Munshi | G06F 9/4843 719/328 |
| 2009/0055826 A1* | 2/2009 | Bernstein | G06F 9/3851 718/102 |
| 2009/0144744 A1* | 6/2009 | Gunnels | G06F 9/4881 718/105 |
| 2010/0077185 A1* | 3/2010 | Gopalan | G06F 9/5033 712/220 |
| 2011/0258413 A1* | 10/2011 | Cho | G06F 11/3419 712/16 |
| 2011/0320391 A1* | 12/2011 | Chen | G06F 11/3452 706/14 |
| 2012/0079298 A1* | 3/2012 | Majumdar | G06F 11/3409 713/320 |
| 2012/0081373 A1* | 4/2012 | Li | G06F 9/4893 345/520 |
| 2012/0173895 A1* | 7/2012 | Kim | G06F 1/3206 713/300 |
| 2012/0233393 A1* | 9/2012 | Jiang | G06F 9/46 711/105 |
| 2012/0284732 A1* | 11/2012 | Griglock | G06F 9/5066 718/104 |
| 2012/0291040 A1* | 11/2012 | Breternitz | G06F 9/5083 718/104 |
| 2013/0024713 A1* | 1/2013 | Bajic | G06F 1/3206 713/340 |
| 2013/0060555 A1* | 3/2013 | Thomson | G06F 1/3203 703/21 |
| 2013/0132934 A1* | 5/2013 | Munshi | G06F 9/541 717/149 |
| 2013/0160016 A1* | 6/2013 | Gummaraju | G06F 9/5044 718/102 |
| 2014/0068582 A1* | 3/2014 | Chen | G06F 8/451 717/149 |
| 2014/0282607 A1* | 9/2014 | O'Sullivan | G06F 9/4881 718/108 |
| 2014/0325481 A1* | 10/2014 | Pillai | G06F 11/3668 717/124 |
| 2014/0380072 A1* | 12/2014 | Lee | G06F 9/5094 713/322 |
| 2015/0121048 A1* | 4/2015 | Lukefahr | G06F 9/30189 712/229 |
| 2015/0161385 A1* | 6/2015 | Gounares | G06F 21/577 726/25 |
| 2015/0324441 A1* | 11/2015 | Zhou | G06F 16/24569 707/737 |
| 2016/0011925 A1* | 1/2016 | Kulkarni | H04L 43/0817 714/57 |
| 2016/0080284 A1* | 3/2016 | Jeon | H04W 4/60 709/226 |
| 2016/0170476 A1* | 6/2016 | Fu | G06F 11/3447 713/310 |
| 2016/0170882 A1* | 6/2016 | Choi | G06F 11/2094 711/119 |
| 2016/0292028 A1* | 10/2016 | Gamage | G06F 11/0772 |
| 2016/0350088 A1* | 12/2016 | Ravishankar | G06F 8/4434 |
| 2016/0363987 A1* | 12/2016 | Malik | H04L 41/5003 |
| 2017/0123775 A1* | 5/2017 | Xu | G06F 8/451 |
| 2017/0185503 A1* | 6/2017 | Yeh | G06F 11/3409 |
| 2017/0212563 A1* | 7/2017 | Farazmand | G06F 9/5027 |
| 2017/0235608 A1* | 8/2017 | Zhuang | G06F 11/3006 718/104 |
| 2017/0256023 A1* | 9/2017 | Li | G06F 3/0656 |
| 2017/0353397 A1* | 12/2017 | Che | H04L 67/10 |
| 2017/0357302 A1* | 12/2017 | Dorsey | G06F 1/324 |
| 2019/0012197 A1* | 1/2019 | Memon | G06F 9/485 |
| 2020/0192710 A1* | 6/2020 | Kumar | H04L 43/0876 |
| 2020/0301736 A1* | 9/2020 | Kutschbach | G06F 9/4881 |
| 2021/0240457 A1* | 8/2021 | Yamato | G06F 11/34 |

OTHER PUBLICATIONS

H. Mehdi Akbari, "An efficient algorithm for compile-time task scheeduling problem on heterogeneous computing systems," Semantics Scholar, vol. 7, No. 1, Jan. 2015, pp. 192-202.

* cited by examiner

HYBRID COMPUTING DEVICE SELECTION ANALYSIS

BACKGROUND

The present invention generally relates to heterogeneous computing platforms, and more specifically, to a static and dynamic analysis for selecting hardware devices to execute computer code in a hybrid computing platform.

Computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Heterogeneous or hybrid computing platforms are becoming commonplace across all major application domains. To reduce program execution times, hardware accelerator devices can be found in systems that vary from mobile phones to supercomputers which operate as heterogeneous computing platforms. The proliferation of these heterogeneous computing platforms has spurred the development of programming models that allow developers to write applications that target execution on accelerator devices. High-level programming models provide the means to write architecture-agnostic accelerator code. Programs written using such high-level programming models are meant to be written once in a generic fashion and to be able to run on a variety of computational devices from ordinary general-purpose CPUs to Graphics Processing Unit (GPU), Field-Programmable Gate Array (FPGA), and Many Integrated Core (MIC) coprocessors. Target agnostic programming abstracts the details of accelerator architecture from the developer and makes it the prerogative of the compiler/runtime to handle architecture-specific code-generation, optimization, and parameter tuning, within the limits allowed by the programming model.

SUMMARY

Embodiments of the present invention are directed to a computer-implemented method for hardware device selection in a computing environment. A non-limiting example of the computer-implemented method includes receiving, by a processor, a request to execute a programming code, wherein the processor is operating in a hybrid computing environment comprising a plurality of hardware devices. A performance model associated with the programming code is obtained by the processor. Runtime data associated with the programming code is obtained by the processor. The runtime data is fed in to the performance model to determine an execution cost for executing the programming code on each of the plurality of hardware devices and a target hardware device is selected from the plurality of hardware devices based on the execution costs.

Embodiments of the invention are directed to a computer program product for hardware device selection in a computing environment, the computer program product comprising a computer readable storage medium having program instructions embodied therewith. The program instructions are executable by a processor to cause the processor to perform a method. A non-limiting example of the method includes receiving, by a processor, a request to execute a programming code, wherein the processor is operating in a hybrid computing environment comprising a plurality of hardware devices. A performance model associated with the programming code is obtained by the processor. Runtime data associated with the programming code is obtained by the processor. The runtime data is fed in to the performance model to determine an execution cost for executing the programming code on each of the plurality of hardware devices and a target hardware device is selected from the plurality of hardware devices based on the execution costs.

Embodiments of the present invention are directed to a system for hardware device selection in a computing environment. A non-limiting example of the system includes a processor communicatively coupled to a memory and a plurality of hardware devices, wherein the processor is configured to receive a request to execute a programming code, wherein the processor is operating in a hybrid computing environment comprising a plurality of hardware devices. A performance model associated with the programming code is obtained by the processor. Runtime data associated with the programming code is obtained by the processor. The runtime data is fed in to the performance model to determine an execution cost for executing the programming code on each of the plurality of hardware devices and a target hardware device is selected from the plurality of hardware devices based on the execution costs.

Embodiments of the present invention are directed to a computer-implemented method for hardware device selection in a computing environment. A non-limiting example of the computer-implemented method includes receiving, by a processor, a request to execute a target region of code from a programming code, wherein the processor is operating in a hybrid computing environment comprising a plurality of hardware devices, and wherein the target region of code is extracted from the programming code at compilation time based one or more flags associated with the target region of code. Obtaining, by the processor, a performance model associated with the target region of code. Obtaining, by the processor, runtime data associated with the target region of code. Obtaining, by the processor, hardware description data associated with each of the plurality of hardware devices. Feeding the runtime data and hardware description data in to the performance model to determine an execution cost for executing the target region of code on each of the plurality of hardware devices and selecting a target hardware device from the plurality of hardware devices based on the execution Embodiments of the invention are directed to a computer program product for hardware device selection in a computing environment, the computer program product comprising a computer readable storage medium having program instructions embodied therewith. The program instructions are executable by a processor to cause the processor to perform a method. A non-limiting example of the method includes receiving, by a processor, a request to execute a target region of code from a programming code, wherein the processor is operating in a hybrid computing environment comprising a plurality of hardware devices, and wherein the target region of code is extracted from the programming code at compilation time based one or more flags associated with the target region of code. Obtaining, by the processor, a performance model associated with the target region of code Obtaining, by the processor, runtime data associated with the target region of code. Obtaining, by the processor, hardware description data associated with each of the plurality of hardware devices. Feeding the runtime data and hardware description data in to the performance model to determine an execution cost for executing the target region of code on each of the plurality of hardware devices and selecting a target hardware device from the plurality of hardware devices based on the execution costs.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
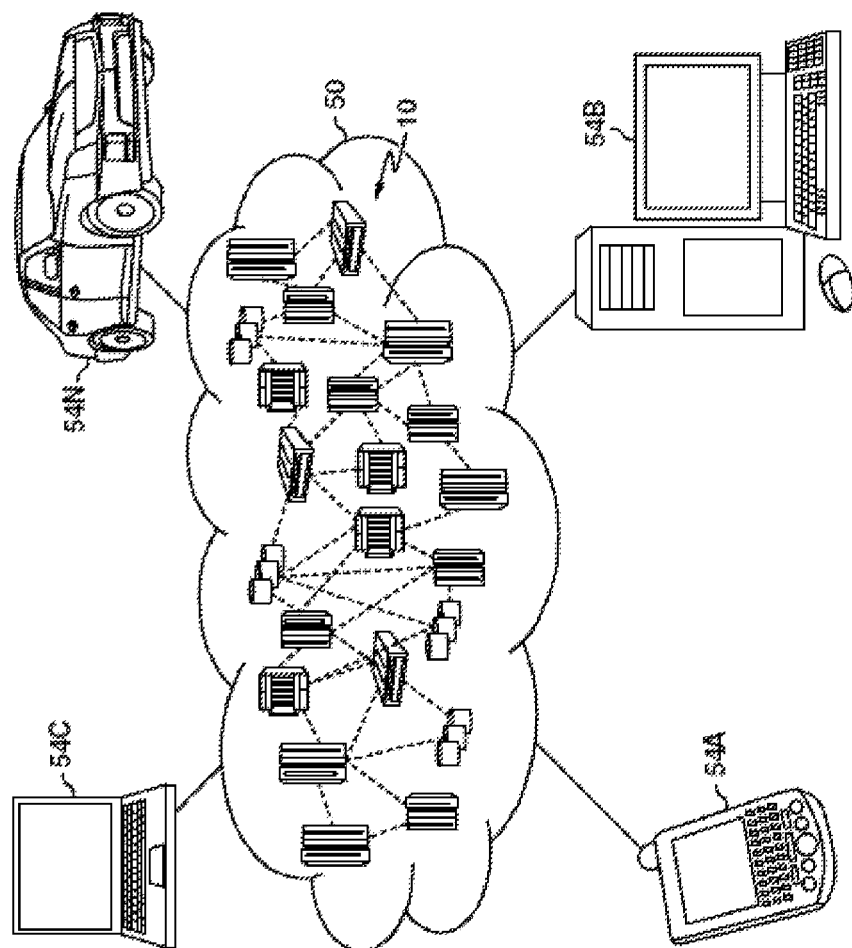
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
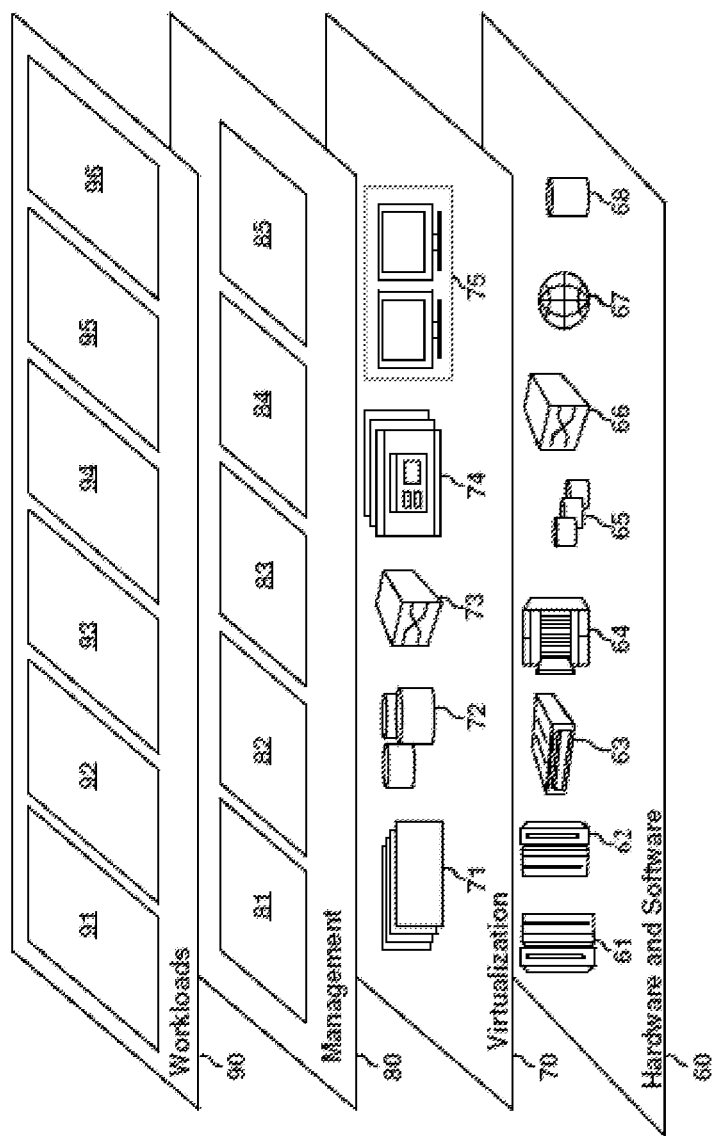
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid computing device selection 96.

Figure 3:
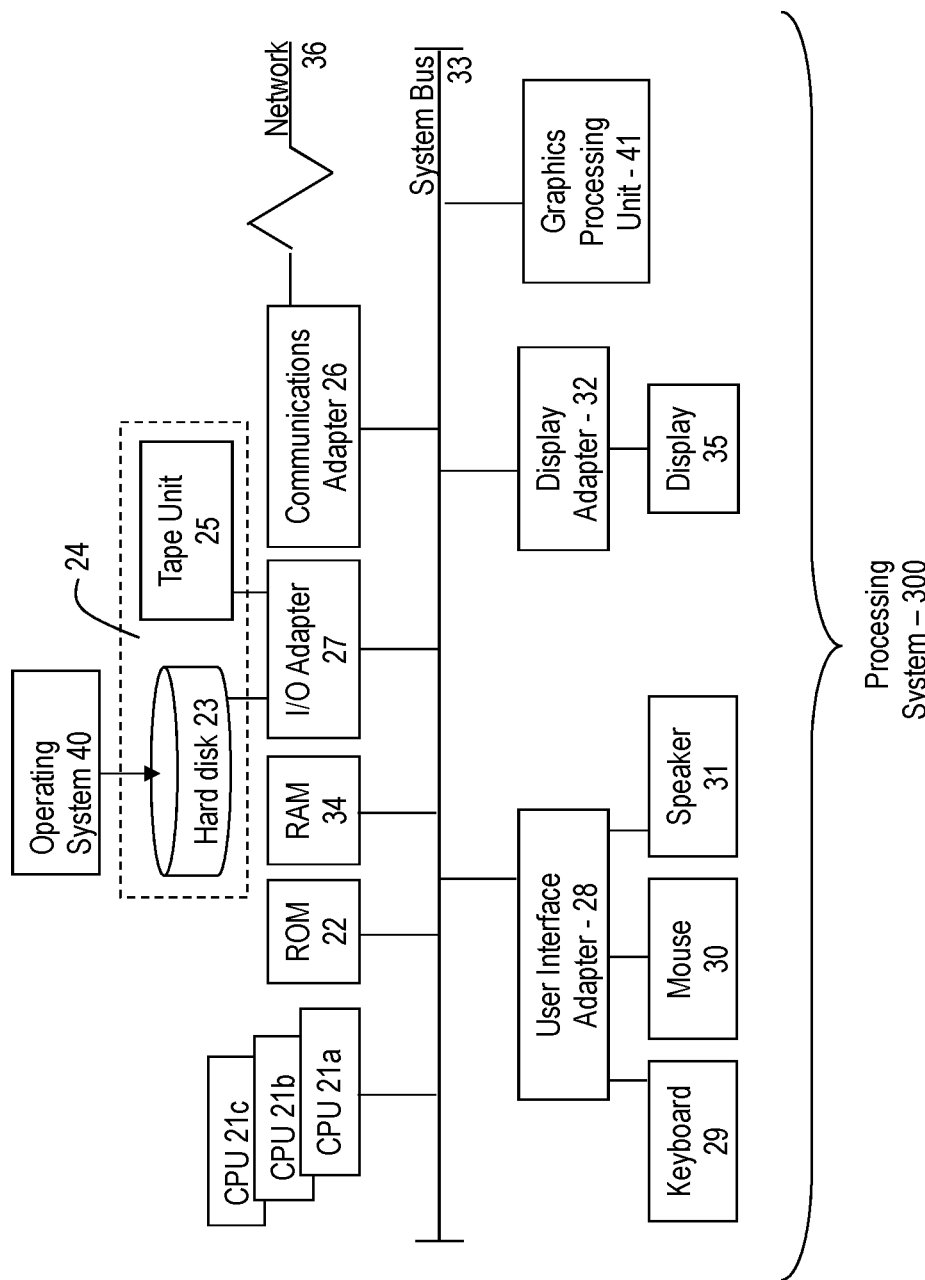
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or solid state storage drive 25 or any other similar component. I/O adapter 27, hard disk 23, and solid state storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, various competing accelerator platforms co-exist, often within the same host machine, as each has its own strengths, weaknesses, and corresponding favorable application domains. Moreover, different accelerator architectures place different, often opposing, demands on attributes of computer programs. Such demands must be met in order to achieve acceptable levels of performance. There exists a need for a process for building a compiler/runtime that is able to generate optimized executable code for various available device architectures when it is given (1) a computer program written using a target-independent programming model, and (2) a computing system containing two or more valid computing devices (e.g., heterogeneous computing environment).

Turning now to an overview of the aspects of the invention, one or more embodiments of the invention address the above-described shortcomings of the prior art by providing a process that operates by selecting, at program launch time, a device (e.g., accelerator, CPU, etc.) available in a heterogeneous (hybrid) computing system that is appropriate to execute each portion of a program. This selection process can favor a device that maximizes a certain performance criteria. In essence, the selection process decides which device should execute each portion of a program. Technical benefits include the combination of static and runtime program attributes to select one among several available computing platforms available to execute the program. Two benefits of the selection process include a compile-time code analysis and transformation framework that gathers code properties that will be useful for target device selection. And, a runtime symbolic evaluation engine that completes statically-collected data with execution-time-available values. In addition, the runtime symbolic evaluation engine collects hardware/machine description information (which is not provided by the static (compile-time) component) and uses all of the above components to form an analytical model of performance on each architecture and actually makes a decision for selection of an appropriate hardware accelerator or computing device.

Figure 4:
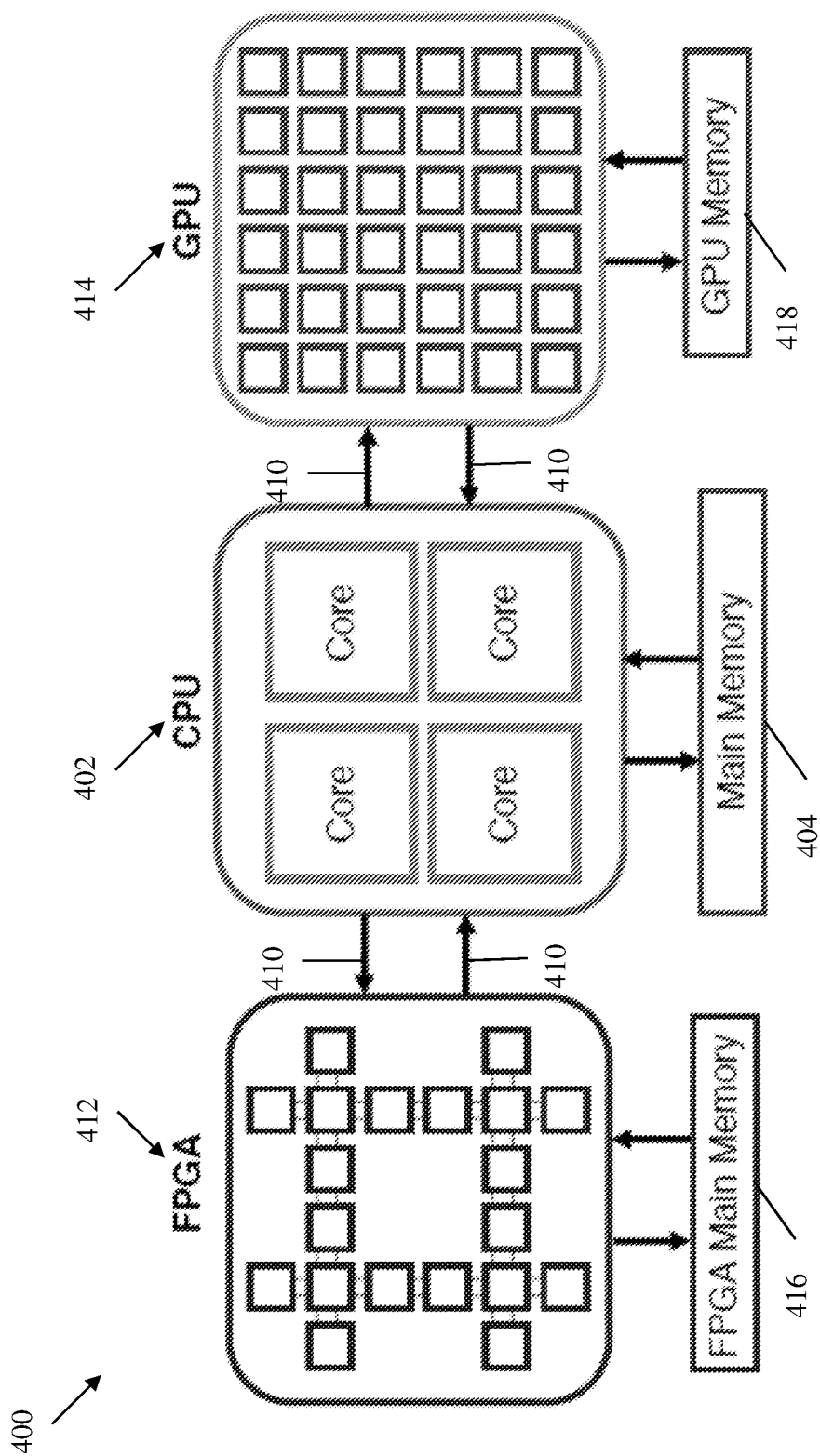
FIG. 4 depicts an exemplary heterogeneous computing system 400 according to embodiments of the invention.

Turning now to a more detailed description of aspects of the present invention, FIG. 4 depicts an exemplary heterogeneous computing system 400 according to embodiments of the invention. The heterogeneous computing system 400 includes a host machine that operates using a CPU 402 which includes memory modules for a main memory 404. Attached to the CPU 402 via data-transfer buses 410 are a field programmable gate array (FPGA) 412 and a graphical processing unit (GPU) 414. The CPU 402, housed on a host machine, performs the overall system 400 operation, memory management, and control of execution among attached devices 412, 414. During execution of a program that contains an accelerator kernel (i.e., a piece of computation specified to be offloaded to an accelerator), the host machine (e.g., CPU 402) schedules execution of the kernel on a given computing device and performs the necessary data transfers to and from the computing device. The system 400 described herein is merely exemplary and not intended to limit the application, uses, and/or technical scope of the present invention, which can be embodied in various forms. FIG. 4 is merely a non-limiting example presented for illustrative and explanatory purposes.

In embodiments of the invention, various programming models can be utilized to run on the heterogeneous computer system 400 that allows offloading of computation to an accelerator device. Certain programming models allow for capabilities for programmers to specify target segments—blocks code to be executed on an accelerator device. Data is transferred from the CPU 402 to the accelerator device's memory environment for processing 416, 418. These data transfers can occur automatically in case of memory-coherent accelerators or through insertion of explicit data-transferring instruction by a compiler. Target regions can result in executable code that is generated in a fashion that is specific to an accelerator's architecture. For example, if a target region specifies a parallel loop to be executed, when generating GPU-executable code for this parallel loop, the compiler can transform the code into a data-parallel single instruction, multiple thread (SIMT) form. Should an FPGA device 412 be a compilation target, better performance can be achieved through parallelism obtained by pipelining operations of the loop. For a many-core accelerator or a CPU-bound target, a vector SIMD version of the loop would achieve better performance. In an environment that contains multiple heterogeneous computing devices, the compiler may generate multiple versions of the same block of code: each one specialized for a given computing device.

In one or more embodiments of the invention, the CPU 402 and hardware accelerators 412, 414 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

Figure 5:
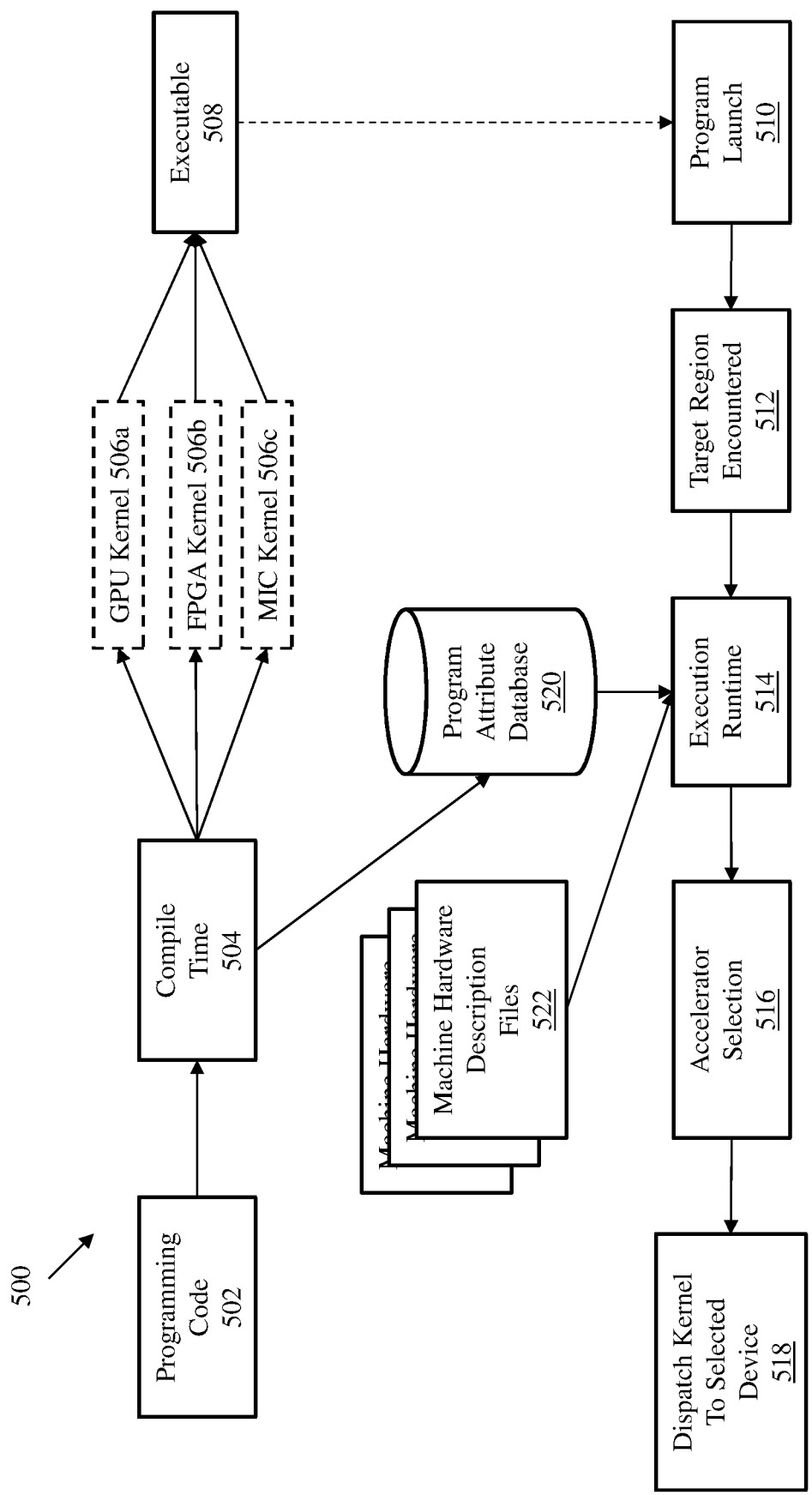
FIG. 5 depicts a process flow diagram for performing a static and dynamic analysis to select a hardware acceleration for execution of a programming code according to one or more embodiments of the invention.

FIG. 5 depicts a process flow diagram for performing a static and dynamic analysis to select a hardware acceleration for execution of a programming code according to one or more embodiments of the invention. The process 500 can be implemented on any hybrid computing environment including, but not limited to, the system 400 in FIG. 4. One or more of the process steps described herein can be performed by a CPU 402 from FIG. 4 or any other CPU in the hybrid computing environment. The process 500 provides for the selection of an optimal computing (hardware) device (e.g., FPGA 412, GPU 414, MIC, or CPU 402) by an execution runtime based on the attributes of a programming code for execution and the computing devices themselves. Another attributed can be the program input. For example, the program input size (i.e., the amount of data that will get processed in a given run) can be an attributed of the programming code that assists with hardware device selection. The process 500 includes the receiving of programming code 502 for compilation, by a compiler. At compile time 504, the compiler can analyze the incoming programming code 502 and generate optimized compute kernels 506a-c for each of the computing devices available on the hybrid computing environment. While, in the illustrated example, only three compute kernels 506a-c are shown, any number of compute kernels can be generated by the compiler for any number of computing devices (e.g., accelerators). During compile time, the compiler identifies one or more target regions of the programming code 502 that would be candidates for execution by a computing device. Each of the target regions of code can have an optimized compute kernel 506a-c for each of the computing devices available on the hybrid computing environment. The target regions of code can be identified by the compiler or can be identified by the developer of the programming code utilizing flags for different regions of the programming code 502, for example.

In one or more embodiments, after the compute kernels are generated for each computing device, a static analysis can be performed on each of the target regions of the programming code 502. During this static analysis, the CPU creates a performance model that can be utilized to estimate the execution time for each potential computing device. During compile time 504, the performance model cannot be fully evaluated because the model can depend on values that cannot be known at compilation time and that are later discoverable at runtime. For example, the static analysis performance model may take into consideration the type of parallelism specified in a compute kernel. Explicitly data-parallel compute kernels are inherently better suited for a specific accelerator (e.g., a GPU). On the other hand, task-parallel compute kernels have best performance on a MIC or an FPGA execution platform. Another factor for the performance model includes the amount of work performed by individual threads. For example, if the amount of computation done by each thread is very small, threads will finish execution very quickly and will have to be queued to be scheduled for more processing work. In this example, the overhead of scheduling more work to be performed on a GPU in a very small time will be larger than the actual compute kernel computation, leading to poor performance. The static analysis also determine compute kernel attributes such as instruction counts and instruction types. However, as mentioned above, the unknown parameters from the static analysis for the programming model does not allow for optimal selection of a computing device for selection to execute the target regions of the programming code 502. At compile time, the performance model and unknown parameters are stored in the program attributed databased 520. In one or more embodiments of the invention, the performance model can include a symbolic equation for specific performance attributes, such as memory access, parallelism types, and the like. The symbolic equations for the performance model can be utilized with known values at runtime to provide for better selection of an optimal computing device for execution of the target region of the programming code 502.

In one or more embodiments of the invention, after generation of the compute kernels 506a-c and the static analysis, the programming code 502 is now executable 508 and awaits the program launch 510 stage. The time between executable 508 stage and the program launch 510 stage can be any length of time. Also, the program launch 510 time can happen arbitrary amount of times with arbitrary inputs at any point with the same executable 508. At the program launch 510 stage, the process 500 will encounter the target regions, as shown at block 512. During the execution runtime 514, at the point immediately before the execution of a target region, the CPU collects information that was not available at compilation time, inserts this information in to the performance models generated during the static analysis, and selects the best computing device for execution of the target region of the programming code 502 based on the performance estimates provided by the performance model. The execution runtime 514 can obtain information from multiple sources. For the characteristics of each of the executable platforms available, the execution runtime 514 can query the hardware descriptor files 522 associated with the computing devices. In one or more embodiments of the invention, the execution runtime 514 can query accelerator-manufacturer-provided application programming interfaces (APIs) to query device specifications for the computing devices. From either of these sources, the execution runtime 514 can extract details that would affect the decision of which of the available hardware platforms (e.g., computing devices) suits a certain application best. For example, the number of streaming multiprocessors (SM) in each GPU determines the minimum amount of parallelism required by a program to be suitable for GPU execution. Also, the number of cores on a MIC, the number of threads available on a CPU, and the specifics of the cache hierarchy may similarly influence the final computing device selection (accelerator selection 516) in the process 500.

In one or more embodiments of the invention, another source of information for the accelerator selection 516, are the values of variables that are not known at compilation time 504. One type of variable includes the trip count of a parallel loop. This trip count value is often only available at runtime. The trip count determines the amount of parallelism in the loop. An iteration of a parallel loop typically maps to work done by a single thread. Thus, this metric serves as an indication of the number of threads that should be spawned in order to perform the given computation. If the number of loop iterations is relatively small, it will require an insubstantial amount of parallelism for execution. A loop with a small trip count would, for instance, not take advantage of a GPU massive parallelism. In this case, the data transfer to and from the GPU (via a BUS) is likely to dominate the execution time. Because of the programming code, in this example, being a loop, a static analysis, alone, might indicate that a GPU should be utilized to execute the loop due to GPU's massive parallelism. However, the current process 500 includes the dynamic, runtime analysis to "fill-in" unknown parameters during the static analysis (during compile time 504) to better suit the selection of a hardware accelerator. Continuing with the example of the trip count value being relatively small, the accelerator selection would select the CPU or an accelerator with lesser occupancy demands for the execution of this loop (e.g., target region). The CPU can then dispatch the corresponding compute kernel to the selected device, as shown at block 518.

In one or more embodiments of the invention, for a GPU, the performance model (created at compile time) can take into consideration a parallel loop's utilization of the GPU's streaming multiprocessors. If the amount of parallel work items will not saturate the available number of streaming multiprocessors, some streaming multiprocessors will stay idle. If a large number of streaming multiprocessors would be idle, the process 500 will deem the loop to be insufficiently parallel for GPU execution and would likely select a different computing device for execution of the target region of programming code. As another example, in the case of loop nests, the performance model can also depend on the trip counts of inner loops of the loop nests. The trip counts of the inner loops can be extracted by the runtime prior to the start of the execution of the loop nests. These values can be used, for instance, to determine the amount of work performed for the target region (e.g., inner nests). When the static analysis is performed at compilation time, the approximation for the number of instructions of each type executed by the loops nests can be determined. Then, at runtime, when the trip counts values can be determined, the performance model is fed these values which in turn will estimate the execution costs associated with executing these target regions and select an appropriate computing device for execution. In one or more embodiments, the execution costs that can be outputted from the performance model when the dynamic analysis (e.g., determining runtime parameters) is completed can include total time for execution, a monetary cost for execution, a computing device current and/or future workload, BUS speeds for sending data back and forth to a computing device, and the like.

In one or more embodiments of the invention, given the different memory organizations in different computing devices, the memory access pattern can be an input to the performance model. Thus, the static analysis is utilized to determine the memory access stride of the compute kernels by constructing a symbolic equation for the inter-thread stride of a computer program. For example, suppose a compute kernel includes a parallel loop for execution. A symbolic expression for the inter-thread access stride for an array can be constructed where any unknown parameters are identified. For the parallel loop example, the unknown parameter may determine the stride of the memory access. This stride is utilized for the precision of the performance model because it may determine, for example, if the accesses in a GPU can be coalesced into a smaller number of requests to the memory system. In a CPU the stride can determine the number of lines accessed in the caches and also if there would be false sharing in a multiprocessing environment. However, the determination of the stride depends on variable values that are only known at runtime.

Embodiments of the invention, record the symbols for values that are used in the performance models but that are not known at compilation time in the program attribute database 520. In this example, at runtime, at the start of the execution of the target region, the actual value held by a variable is likely to be known. A symbolic-value solver engine can use the newly known value to resolve the symbolic difference to a constant. The resulting more accurate memory access stride information can then be utilized to estimate the execution time (e.g., execution cost) in each computing device.

In one or more embodiments of the invention, the performance models also must account for the amount of data transfer that is needed for execution in each computing device. The amount of data to be transferred is likely to also depend on values that are not known at compilation time. These values can be extracted at compilation time in a similar fashion as described above. The overhead incurred by the data transfers also depends on the hardware characteristics such as data bus speeds and latencies. In this case, such values should also be available in machine description files 522. For example, the data transfer rates in a system equipped with a GPU connected via the one bus type, and an FPGA device connected via another bus type can be quite different. Using the information from the machine description files 522, the information obtained at runtime, and the performance models generated at compilation time, the optimal computing device to execute each target region can be determined.

In one or more embodiments of the invention, the performance model is being fed with new data on every launch of a target region. Then, the performance model is evaluated every time, with the specific parameters of that launch taken into account of the decision. This can be both during execution of the application that contains the target region, or across different application instances that contain the same target region. For example, when executing a matrix in a target region, the initial size of the matrix may be small and more suited to a first computing device. However, as the matrix grows in size, during execution, the more suitable computing device can be different than the first computing device. The more suitable computing device changes during execution as more and more runtime data is collected for the performance model. In addition, during execution, new computing devices may come online that are more suited for execution of the target region of code. For example, when a GPU that was previously busy with execution of another process comes available, the runtime execution can schedule the target region of code to be executed on that GPU if it is better suited based on the performance model and execution costs.

In one or more embodiments of the invention, the performance model can be tailored to a preference for the computing environment. The preferences can include execution costs that include the speed of execution and monetary costs for execution. For example, in a cloud environment, certain computing devices can be located on various cloud servers with each cloud server having an associated monetary costs for computations by the computing devices. These monetary costs for execution can be determined and utilized for selecting a computing device for execution of the code. For example, a hybrid computing environment can set a threshold range for execution speed for processing execution of code. Also, the hybrid computing environment can optimize the monetary costs for execution of the code. If the computing devices fall within the range for execution speed, the computing device selection can be optimized to have the lowest monetary costs for the available computing devices. This can be utilized for offloading execution of computer code target regions based on monetary cost concerns.

Figure 6:
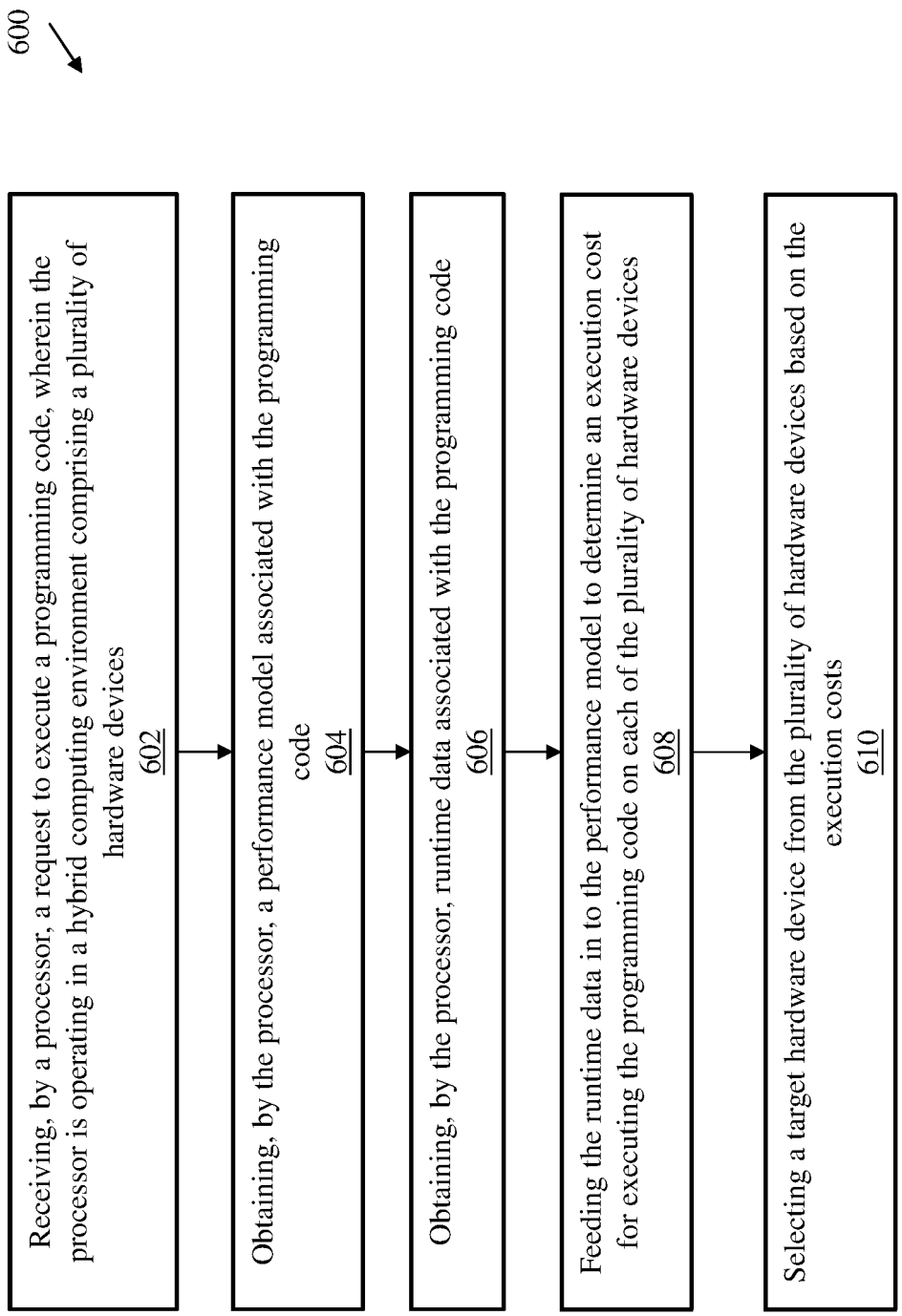
FIG. 6 depicts a flow diagram of a method for hardware device selection in a computing environment according to one or more embodiments of the invention.

FIG. 6 depicts a flow diagram of a method for hardware device selection in a computing environment according to one or more embodiments of the invention. The method 600 includes receiving, by a processor, a request to execute a programming code, wherein the processor is operating in a hybrid computing environment comprising a plurality of hardware devices, as shown in block 602. In block 604, the method 600 includes obtaining, by the processor, a performance model associated with the programming code. The method 600, at block 606, includes obtaining, by the processor, runtime data associated with the programming code. The method 600 includes feeding the runtime data in to the performance model to determine an execution cost for executing the programming code on each of the plurality of hardware devices, as shown at block 608. And at block 610, the method 600 includes selecting a target hardware device from the plurality of hardware devices based on the execution costs.

Additional processes may also be included. It should be understood that the processes depicted in FIG. 6 represent illustrations, and that other processes may be added or existing processes may be removed, modified, or rearranged without departing from the scope and spirit of the present invention.

Figure 7:
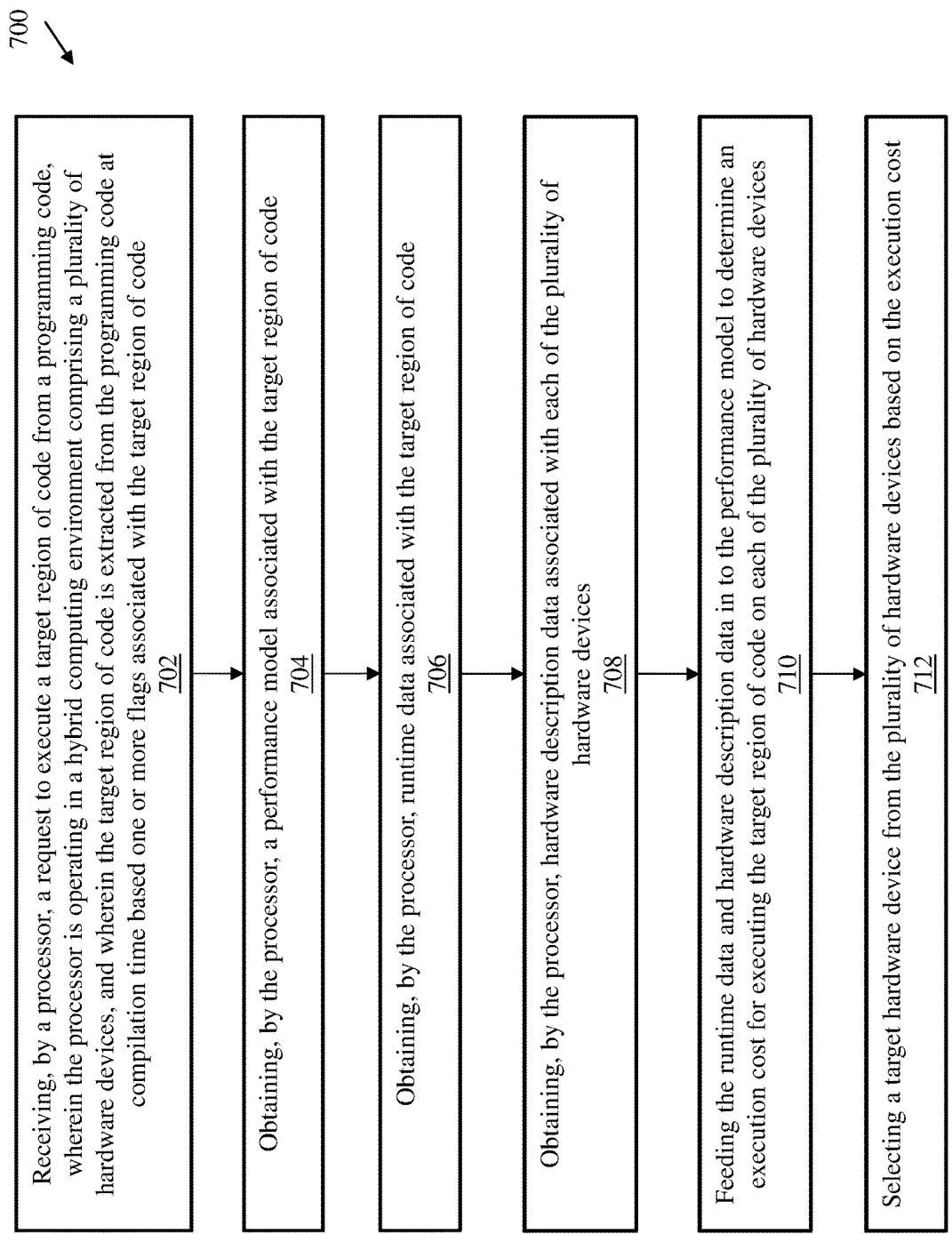
FIG. 7 depicts a flow diagram of a method for hardware device selection in a computing environment according to one or more embodiments of the invention.

FIG. 7 depicts a flow diagram of a method for hardware device selection in a computing environment according to one or more embodiments of the invention. The method 700 includes receiving, by a processor, a request to execute a target region of code from a programming code, wherein the processor is operating in a hybrid computing environment comprising a plurality of hardware devices, and wherein the target region of code is extracted from the programming code at compilation time based one or more flags associated with the target region of code, as shown at block 702. The method 700, at block 704, includes obtaining, by the processor, a performance model associated with the target region of code. At block 706, the method 700 includes obtaining, by the processor, runtime data associated with the target region of code. And at block 708, the method 700 includes obtaining, by the processor, hardware description data associated with each of the plurality of hardware devices. The method 700, at block 710, includes feeding the runtime data and hardware description data in to the performance model to determine an execution cost for executing the target region of code on each of the plurality of hardware devices. And at block 712, the method 700 includes selecting a target hardware device from the plurality of hardware devices based on the execution costs.

Additional processes may also be included. It should be understood that the processes depicted in FIG. 7 represent illustrations, and that other processes may be added or existing processes may be removed, modified, or rearranged without departing from the scope and spirit of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer, readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for hardware device selection in a computing environment, the method comprising:
    receiving, by a processor, a request to execute a programming code, wherein the processor is operating in a hybrid computing environment comprising a plurality of hardware devices;
    generating, by the processor, a compute kernel for each hardware device in the plurality of hardware devices based at least in part on the programming code;
    obtaining, by the processor, a performance model associated with the programming code;
    obtaining, by the processor, an associated monetary cost for computation associated with each of the plurality of hardware devices, wherein the associated monetary cost for computation comprises a server utilization monetary cost for operating each of the plurality of hardware devices on an external server, and wherein obtaining, by the processor, the associated monetary cost for computation comprises:
    determining a threshold range of execution speed for processing the programming code;
    wherein selecting the target hardware device from the plurality of hardware devices based on the execution costs and the associated monetary costs comprises:
    selecting the target hardware device form the plurality of hardware devices having an execution speed within the threshold range of execution speed and having a lowest associated monetary cost;
    obtaining, by the processor, runtime data associated with hybrid computing environment;
    feeding the runtime data into the performance model to determine an execution cost for executing the compute kernel for each of the plurality of hardware devices; and
    selecting a target hardware device from the plurality of hardware devices based on the execution costs and the associated monetary cost.

2. The computer-implemented method of claim 1 further comprising:
    obtaining, by the processor, hardware description data associated with each of the plurality of hardware devices;
    determining an updated execution cost for executing the programming code on each of the plurality of hardware devices based on the hardware description data; and
    selecting an updated target hardware device from the plurality of hardware devices based on a determination that the updated execution cost is lower than the execution cost.

3. The computer-implemented method of claim 1 further comprising scheduling the compute kernel for execution on the target hardware device.

4. The computer-implemented method of claim 1, further comprising:

wherein prior to receiving the request to execute the programming code:

analyzing, by the processor, the programming code to determine that the programming code is a candidate for execution on the plurality of hardware devices;

generating the performance model to estimate an execution cost for the compute kernel to execute on each of the plurality of hardware devices.

5. The computer-implemented method of claim 1, wherein the target hardware device comprises a graphics processing unit (GPU), a field-programmable gate array (FPGA), and a many integrated core (MIC) co-processor.

6. The computer-implemented method of claim 1, wherein the performance model comprises one or more algorithms for determining execution costs for execution of the programming code.

7. The computer-implemented method of claim 1, wherein the runtime data comprises memory access patterns for the programming code.

8. A computer program product for hardware device selection in a computing environment, the computer program product comprising a computer readable storage medium having program instructions embodied therewith, wherein the computer readable storage medium is not a transitory signal per se, the program instructions executable by a processor to cause the processor to perform a method comprising:

receiving, by a processor, a request to execute a programming code, wherein the processor is operating in a hybrid computing environment comprising a plurality of hardware devices;

generating, by the processor, a compute kernel for each hardware device in the plurality of hardware devices based at least in part on the programming code;

obtaining, by the processor, a performance model associated with the programming code;

obtaining, by the processor, an associated monetary cost for computation associated with each of the plurality of hardware devices, wherein the associated monetary cost for computation comprises a server utilization monetary cost for operating each of the plurality of hardware devices on an external server, and wherein obtaining, by the processor, the associated monetary cost for computation comprises:

determining a threshold range of execution speed for processing the programming code;

wherein selecting the target hardware device from the plurality of hardware devices based on the execution costs and the associated monetary costs comprises:

selecting the target hardware device form the plurality of hardware devices having an execution speed within the threshold range of execution speed and having a lowest associated monetary cost;

obtaining, by the processor, runtime data associated with the hybrid computing environment;

feeding the runtime data into the performance model to determine an execution cost for executing the compute kernel for each of the plurality of hardware devices; and selecting a target hardware device from the plurality of hardware devices based on the execution costs and the associated monetary cost.

9. The computer program product of claim 8 further comprising:

obtaining, by the processor, hardware description data associated with each of the plurality of hardware devices;

determining an updated execution cost for executing the programming code on each of the plurality of hardware devices based on the hardware description data; and selecting an updated target hardware device from the plurality of hardware devices based on a determination that the updated execution cost is lower than the execution cost.

10. The computer program product of claim 8 further comprising scheduling the compute kernel for execution on the target hardware device.

11. The computer program product of claim 8, further comprising:

wherein prior to receiving the request to execute the programming code:

analyzing, by the processor, the programming code to determine that the programming code is a candidate for execution on the plurality of hardware devices;

generating the performance model to estimate an execution cost for the compute kernel to execute on each of the plurality of hardware devices.

12. The computer program product of claim 8, wherein the target hardware device comprises a graphics processing unit (GPU), a field-programmable gate array (FPGA), and a many integrated core (MIC) co-processor.

13. The computer program product of claim 8, wherein the performance model comprises one or more algorithms for determining execution costs for execution of the programming code.

14. The computer program product of claim 8, wherein the runtime data comprises memory access patterns for the programming code.

15. A system for hardware device selection in a computing environment comprising:

a processor communicatively coupled to a memory and a plurality of hardware devices, wherein the processor is configured to:

receive a request to execute a programming code, wherein the processor is operating in a hybrid computing environment comprising a plurality of hardware devices;

generate a compute kernel for each hardware device in the plurality of hardware devices based at least in part on the programming code;

obtain a performance model associated with the programming code;

obtain an associated monetary cost for computation associated with each of the plurality of hardware devices, wherein the associated monetary cost for computation comprises a server utilization monetary cost for operating each of the plurality of hardware devices on an external server, and wherein obtaining, by the processor, the associated monetary cost for computation comprises:

determining a threshold range of execution speed for processing the programming code;

wherein selecting the target hardware device from the plurality of hardware devices based on the execution costs and the associated monetary costs comprises:

selecting the target hardware device form the plurality of hardware devices having an execution speed within the threshold range of execution speed and having a lowest associated monetary cost;

obtain runtime data associated with the hybrid computing environment;

feed the runtime data into the performance model to determine an execution cost for executing the compute kernel for each of the plurality of hardware devices; and select a target hardware device from the plurality of hardware devices based on the execution costs and the associated monetary cost.

16. The system of claim 15, wherein the processor is further configured to schedule the compute kernel for execution on the target hardware device.

17. The system of claim 15, wherein prior to receiving the request to execute the programming code, the processor is further configured to:

analyze the programming code to determine that the programming code is a candidate for execution on the plurality of hardware devices;

generate the performance model to estimate an execution cost for the compute kernel to execute on each of the plurality of hardware devices.

* * * * *